(No Model.)

A. MONTGOMERY.
CLOTHES LINE HOLDER.

No. 351,199. Patented Oct. 19, 1886.

Witnesses:
David Williams
Harry Drury

Inventor:
A. Montgomery
by his Attorneys
Howson & Sons

UNITED STATES PATENT OFFICE.

ARCHIBALD MONTGOMERY, OF PHILADELPHIA, PENNSYLVANIA, ASSIGNOR OF ONE-HALF TO THOMAS J. ANDRESS, OF SAME PLACE.

CLOTHES-LINE HOLDER.

SPECIFICATION forming part of Letters Patent No. 351,199, dated October 19, 1886.

Application filed August 1, 1885. Serial No. 173,246. (No model.)

*To all whom it may concern:*

Be it known that I, ARCHIBALD MONTGOMERY, a subject of the Queen of Great Britain and Ireland, and a resident of Philadelphia, Pennsylvania, have invented certain Improvements in Clothes-Line Holders, of which the following is a specification.

My invention relates to that class of clothes-line or rope holders in which the rope is passed over arms on a holder pivoted to a fixed support, my invention comprising certain improvements in the detailed construction of a clothes-line holder of this class, the character and objects of which improvements are fully set forth hereinafter.

Figure 1:
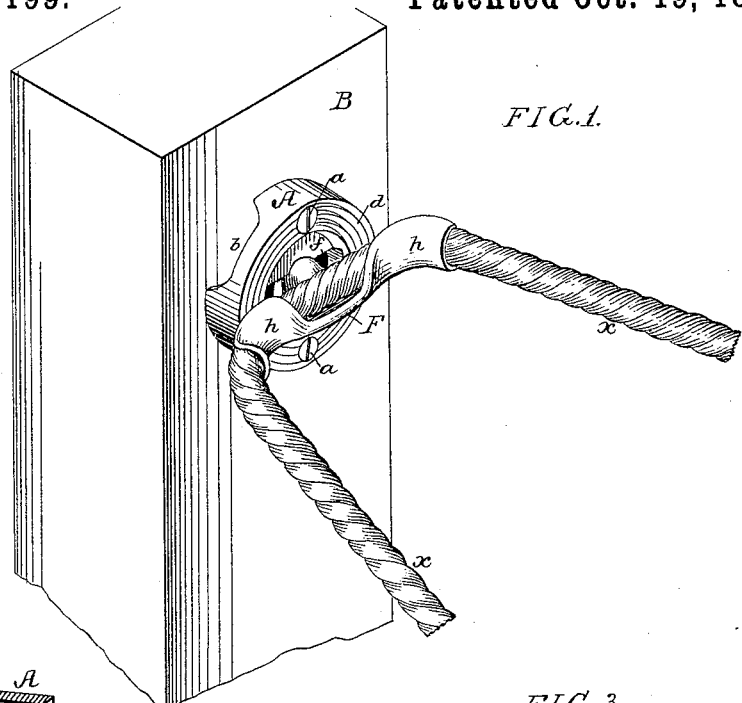
Figure 2:
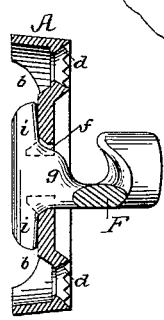
Figure 3:
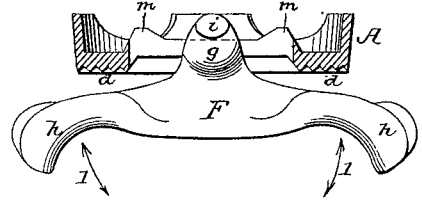

In the accompanying drawings, Figure 1 is a perspective view showing my improved clothes-line holder secured to a post, and illustrating the manner of applying the line to the holder; Fig. 2, a transverse section, partly in elevation, of the holder, on the line 1 2, Fig. 4; Fig. 3, a sectional plan view of the same, also partly in elevation, on the line 3 4, Fig. 4; and Fig. 4, a rear view of the holder.

A represents a box or casing, circular in shape, and adapted to be secured to a post, B, or other support, by screws $a$, the side flange of this box being provided with recesses $b$, as shown, so as to prevent the accumulation of water, snow, or dirt within the box. On the face of the box, adjacent to the edge of the same, is a ribbed surface, $d$, and in the face of the box is a central horizontal slot, $f$, contained within the limits of this ribbed portion, and adapted for the reception of the shank $g$ of the line-holder F, the latter having opposite arms, $h\ h$, curved in cross-section, and adapted for the reception of the line $x$, as shown in Fig. 1.

Figure 4:
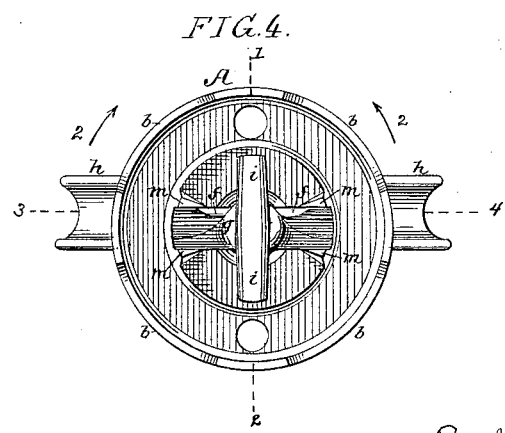

The inner end of the shank $g$ of the holder has a T-head, $i$, the front faces of the arms comprising which are rounded, and in applying the holder to the box this T-head is passed through the slot $f$ in the latter, the holder being then turned so as to adjust the T-head to the position shown in Figs. 2, 3, and 4, and permit the rounded faces of the arms to bear upon the inner side of the box, as shown in said figures. The holder F is thus free to tilt or swing in two directions—that is to say, owing to the rounded faces of the arms of the T-head, it can swing on an axis parallel with said T-head in the direction of the arrows 1, Fig. 3, while, owing to the fact that the arms of the T-head are unconfined laterally, the holder can turn on the axis of its shank, or in the direction of the arrows 2, Fig. 4; hence when there is a greater strain upon one portion of the line than upon the other, one arm, $h$, of the holder F will be drawn outward and the other arm forced inward, so as to press that portion of the line carried thereby against the grooved face of the box A, and thus prevent slipping of the line through the holder, while if one portion of the line is propped up the arm carrying that portion of the line will be free to rise and the other arm to descend, the limit of movement in this direction being determined by stops $m$ on the back of the box.

An upper segmental bearing for the upper arm of the T-head and a lower segmental bearing for the lower arm of the same are thus provided, both of which segmental bearings are concentric with the axis of the shank $g$, and the ribbed annular face of the box forms behind each arm of the line-holder a concentric bearing for that portion of the line carried by said arm, so that a proper bearing for the line is provided, whatever may be the position assumed by the holder.

I therefore claim as my invention—

1. The combination of the line holder having opposite arms for the reception of the line, with the box A, to which said line-holder is centrally pivoted, the face of said box forming behind each arm of the holder a bearing for the rope concentric with the axis of the holder, all substantially as specified.

2. The combination of the line-holder having opposite arms, and central shank with T-head, the arms of which have rounded faces, with the box A, having segmental bearings for the arms of said T-head, whereby swinging movement of the line-holder in two directions is permitted, all substantially as specified.

3. The combination of the box A, having a slot, $f$, with the line-holder having opposite arms, h h, and shank with T-head i, all substantially as specified.

4. The combination of the holder having opposite arms and central T-headed shank, with the box having segmental bearings for the arms of said T-head, and provided with a side flange having recesses b, all substantially as set forth.

In testimony whereof I have signed my name to this specification in the presence of two subscribing witnesses.

ARCHIBALD MONTGOMERY.

Witnesses:
WILLIAM F. DAVIS,
HARRY SMITH.